United States Patent [19]
Takeda et al.

[11] Patent Number: 6,128,316
[45] Date of Patent: Oct. 3, 2000

[54] DATA TRANSMITTING APPARATUS DATA RECEIVING APPARATUS AND DATA TRANSMISSION CONTROL APPARATUS

[75] Inventors: Hidetoshi Takeda, Neyagawa; Hiroyuki Iitsuka; Takuya Nishimura, both of Katano; Masazumi Yamada, Moriguchi, all of Japan

[73] Assignee: Matsushita Electric Industrial Co., Ltd., Osaka, Japan

[21] Appl. No.: 08/945,629

[22] PCT Filed: Apr. 25, 1996

[86] PCT No.: PCT/JP96/01123

§ 371 Date: Apr. 23, 1998

§ 102(e) Date: Apr. 23, 1998

[87] PCT Pub. No.: WO96/34477

PCT Pub. Date: Oct. 31, 1996

[30] Foreign Application Priority Data

Apr. 28, 1995 [JP] Japan ................................. 7-105554
Jun. 14, 1995 [JP] Japan ................................. 7-147209
Aug. 1, 1995 [JP] Japan ................................. 7-196345

[51] Int. Cl.[7] ........................................................ H04J 3/16
[52] U.S. Cl. ................................................ 370/468; 370/464
[58] Field of Search ................................... 370/468, 464, 370/469, 351, 352, 357, 498, 503, 507, 508

[56] References Cited

U.S. PATENT DOCUMENTS 5,535,208  7/1996  Kawakami ........................... 370/468
5,646,941  7/1997  Nishimura .......................... 370/389
5,689,244  11/1997 Iijima ................................... 370/357
5,724,517  3/1998  Cook ................................... 709/227

FOREIGN PATENT DOCUMENTS 63-191436  8/1988  Japan .
2-146846   6/1990  Japan .
5-122238   5/1993  Japan .
6-46394    2/1994  Japan .
7-38579    2/1995  Japan .
7-74768    3/1995  Japan .
7-222263   8/1995  Japan .
8-18581    1/1996  Japan .
8-23584    1/1996  Japan .

OTHER PUBLICATIONS

Japanese language search report for International Appln. No. PCT/JP96/01123.
English translation of Japanese language search report for International Appln. No. PCT/JP96/01123.

*Primary Examiner*—Ajit Patel
*Assistant Examiner*—Ricardo M. Pizarro
*Attorney, Agent, or Firm*—Ratner & Prestia

[57] ABSTRACT

It is objected to simplify a procedure concerning bandwidth acquisition. Bandwidth acquiring means 809 of a second transmitting apparatus 814 acquires a bandwidth which was used by a first transmitting apparatus 806 by using a propagation delay identifier 804 read from first transmitting apparatus 806 and a maximum transmission data size 805 after stopping transmission of first transmitting apparatus 806. Each apparatus is composed so that transmission is started using this bandwidth and because returning and re-acquisition are not accompanied when the transmission is switched, necessary procedure can be simplified. Further, it is possible to effectively use the bandwidth by using a propagation delay identifier.

5 Claims, 8 Drawing Sheets

DATA TRANSMITTING APPARATUS DATA RECEIVING APPARATUS AND DATA TRANSMISSION CONTROL APPARATUS

TECHNICAL FIELD

The present invention relates to a transmitting apparatus transmitting video and audio signals between digital video/audio apparatuses, acquiring a part of a bandwidth of a transmitting medium before communication.

TECHNICAL BACKGROUND

There is standardization for a bandwidth compression system of a digital video signal and a digital audio signal. The system is called MPEG (Moving Picture Experts Group) and is divided into two groups, MPEG1 subject to storage media at a low rate and MPEG2 which realizes a high picture quality for broadcast and can correspond to different picture sizes. In MPEG2, because compression ratio is variable for a picture size or a required picture quality, the data size per time is variable for broadcast programs and contents.

Further, in MPEG2, standardization is also proceeded for data transmission system used for broadcast. In this transmission system, one program is called stream and the data size is variable in each stream (variable rate) and a system to transmit a plurality of streams all together is standardized. Especially, in the case in which a reproducing apparatus to reproduce compressed video audio signals has to isochronize with the broadcast station which makes compression, like in a case to receive a broadcast wave, a stream called transport stream is used. In this transport stream, a device to make the reproducing apparatus possible to isochronize is included, using a parameter in the stream. In the transport stream, the data is transmitted with a fixed length packet (transport stream packet, hereafter) and data necessary for isochronization is also transmitted with the same kind of packet. It is described in a reference, coding of moving picture and associated audio information Part 1, System" of ISO/IEC International Standard 13818-1, International Technology.

In the case of transmitting a plurality of streams, it is possible to vary the data size per stream if necessary although the bandwidth of the entire transmission medium is fixed. It is possible to effectively use the bandwidth of the determined transmission medium by allocating a broad bandwidth to a stream which a high rate is required and suppressing the rates of the other streams, not equally sharing the bandwidth of the entire transmission medium to each stream.

On the other hand, in the case in which broadcast signal is once received, a specific stream is selected and is transmitted or recorded again, a bandwidth for transmission or recording has to be secured on the basis of the maximum rate in the selected stream. For such a purpose, a method indicating a buffer for smoothing a stream (smoothing buffer, hereafter) and a bandwidth necessary for transmission or recording with a reading rate from the smoothing buffer (leak rate, hereafter) is adopted in MPEG2. The smoothing buffer memory size and the leak rate are shown by parameters included in the stream.

In the method using smoothing buffer and leak rate, the received stream is once stored in a smoothing buffer memory and is read from here at the leak rate. As long as a smoothing buffer memory having a size expressed by a parameter in the stream and a leak rate are used, the smoothing buffer memory is guaranteed not to overflow. Therefore, in the case of being transmitted or recorded again, transmission or recording becomes possible by securing the bandwidth equal to the leak rate. Because by once smoothing the rate, it becomes unnecessary to secure the bandwidth equal to the maximum rate which rarely occurs, the bandwidth at transmitting or recording the stream with a variable rate can be minimum and it is possible to effectively use a transmitting medium or recording medium.

However, because timing information of each transport stream packet is deteriorated by once storing the stream in a smoothing buffer memory, the reproducing apparatus of video and audio signals cannot isochronize. Therefore, in the case of transmission or recording, timing information written in the smoothing buffer memory is added to each packet. On the other hand, at the receiving or reproducing apparatus, the timing information is reproduced by once storing each transport stream packet in a packet having the same size as a smoothing buffer memory and outputting the output based on timing information added to each transport stream packet and as a result, it becomes possible to isochronize at the reproducing apparatus of video and audio signals.

Thus, in order to transmit a MPEG2 transport stream, it is necessary to be able to reproduce the timing of each transport stream packet in the receiving apparatus of the transport stream packet. As such a transmission medium which can reproduce the timing, there is P1394 interface. P1394 is a high speed serial interface for the next generation multimedia which is studied at IEEE. It is described in the reference, High Performance Serial Bus P1394/Draft 7.1v1".

P1394 is a transmitting medium of serial bus type and all nodes connected to a bus have isochronized timing information. When a transport stream packet of MPEG2 is transmitted, the timing of each transport stream packet is secured using the timing information.

An apparatus connected to P1394 (node, hereafter) is connected in a tree structure having branches and a node having a plurality of terminals relays the signal by outputting a signal received from one of the terminals to another terminal. Accordingly, it is secured to arrive to every node connected with data outputted from any node. As a result, P1394 works as a bus theoretically although it has a tree structure.

However, because P1394 realizes a bus by relaying a plurality of nodes, there occurs a propagation delay depending on the number of relaying nodes as well as a propagation delay determined by the length of the transmission medium. Further, in P1394, it is secured that a plurality of nodes do not simultaneously transmit, by that only one node assigns buses.

Thus, an identifier to identify the node (node ID, hereafter) is added to each node composed as a bus. The addition of the node ID is automatically done by initializing a bus generated when a new node is added to the bus or on the contrary, when a node is separated from the bus (bus reset, hereafter). When a bus reset is generated, a node connected to the bus outputs a packet indicating a connection state of the node (self ID packet, hereafter) to the bus according to a predetermined order. The node ID is determined by the output order of the self ID packet and the self ID packet includes the node ID determined at outputting to the self ID packet and information whether the other nodes are connected to each terminal or not. As for the node on the bus, the tree structure composing the bus can be known by receiving and analyzing all of self ID packets outputted from each node.

In P1394, two kinds of transfer, a isochronous transfer used for transferring the data which is necessary of real time such as a MPEG2 transport stream or a digital video signal and an asynchronous transfer used for outputting data which is unnecessary of real time are possible. P1394 works on the basis of every 125 microsecond period (cycle, hereafter) and is used for isochronous transfer at a first half of each cycle and for asynchronous transfer at a second half When a isochronization transfer is done, time, (bandwidth) used during one cycle is acquired in the node controlling the bandwidths before communication. P1394 has a node controlling bandwidth used with isochronous transfer and a bandwidth to be used is acquired from the bandwidth controlling node. The node to execute a isochronous transfer can transfer the data in a range of the acquired bandwidth and the data transmitted with isochronous transfer is outputted as a packet specified by P1394. In a isochronous transfer, it is possible to transfer real time data by secure the transfer of the data size predetermined at every cycle.

The bandwidth to be acquired before transmission is a summation of overhead parts such as a bandwidth necessary for transferring the data in practice and a bandwidth necessary for transferring the data added for propagation delay generated at data transfer and error detection. In P1394, it is possible to use mixture of a plurality of transmission rates and outputs signals directing their transmission rates for identification before packet transmission.

Moreover, apart from MPEG2, a digital VCR for converting video and audio signals into digital data and recording is being developed. In this digital VCR system, a digital video signal is compressed and recorded in a tape. Signal compression method for a high definition (HD, hereafter) television picture as well as standard definition (SD, hereafter) television picture is also being developed. The compressed data size of an HD video signal is twice as much as that of an SD video signal and each is always compressed to data having a fixed rate, different from MPEG.

Because the digital VCR signal is a compressed signal, if it is transmitted after being once restored into an analog video signal and is converted into a digital signal again, picture quality deterioration occurs. Therefore, a digital VCR signal is desired to transmit as a digital signal and P1394 can be used also for a transmission of digital VCR data.

On the other hand, in P1394, every node connected to a bus have an imaginary address space and asynchronous data transfer between nodes is executed as reading and writing of the address space. In a part of the address space, a register used for controlling the working of each node is included. In the node connected to a bus, the node state can be known by reading out from a control register of another node and on the contrary the node can be controlled by writing to the control register.

It is thought to control transmission and reception of the isochronous data, using such a control register. In such a case, a transmission state or a reception state can be known by reading a register for isochronous communication control. On the other hand, it is possible to control to start or stop transmission or reception of the isochronous data by writing a required value into the register.

When a MPEG2 transport stream is transferred using a transmitting medium to communicate after acquiring a bandwidth before transmission, like P1394, it is thought that the data rate changes on the way of transfer and a bandwidth necessary for transfer exceeds the bandwidth already acquired. Its example is the case in which the leak rate varies into a large value by a change of a program during transfer.

On the other hand, when digital VCR data is transferred, it is thought that the signal changes from an SD video signal to an HD video signal on the way of transfer. Its example is the case in which an SD video signal is recorded halfway of the tape and after that the recorded signal changes into an HD video signal. When the tape is playbacked, the signal changes from SD video data to HD video data on the way of playback and the data size changes to twice. Thus, when the data rate changes, transmission exceeding a previously acquired bandwidth could be done.

As an example, there is a case using P1394 in a transmitting medium. When a MPEG2 transport stream is outputted to P1394, a bandwidth is acquired based on a leak rate of the stream outputted before transmission and is outputted. However, when the leak rate changes to a large value on the way of transfer, a bandwidth necessary for outputting exceeds the already acquired bandwidth and there could be a risk to output data more than that corresponding to the previously acquired bandwidth to a bus. On the other hand, when the signal changes from an SD video signal to an HD video signal and the data size increases twice, there is a risk to output twice data of that corresponding to the previously acquired bandwidth to the bus.

In P1394, when data exceeding the data corresponding to the previously acquired bandwidth is supplied to a bus, time required for transmitting data which must transmit during one cycle for isochronous communication exceeds the predetermined and assigned time for isochronous transfer. When such a bandwidth overflowing occurs, asynchronous communication can not be done because the time for asynchronous communication is short. Moreover, when the time required for isochronous data communication exceeds 125 microseconds, the bus becomes impossible to work and not only the data to be a cause but also all isochronous data flowing on the bus can not continue transmission and reception.

As explained above, when a transmitting medium which acquires a part of a bandwidth of the transmitting medium before transmission is used and transmission is done exceeding the acquired bandwidth, there is a problem to interfere the other communications using the same transmitting medium.

On the other hand, the apparatus receiving data through a transmitting medium could receive an incorrect data when the rate of the transmitted data changes to a large value. A first example is the case that the leak rate changes to a large value when a MPEG2 transport stream is received from a transmitting medium and video and audio signals are reproduced from the received data or the transport stream is recorded. A second example is the case that the digital VCR data changes from an SD video data to an HD video data when the digital VCR data is received from the transmitting medium and video and audio signals are reproduced or recorded from the received data. In such a case, because the bandwidth necessary for data transmission exceeds the acquired bandwidth in the transmitting medium bandwidth, the transmitting apparatus can not continue a normal transmission and as a result, an incorrect data could be transferred to the transmitting medium.

When a transport stream or VCR data received at the receiving apparatus is reproduced or recorded, in the case in which an imperfect transport stream or an imperfect digital VCR data is received or the received data is lost, it happens to reproduce or record an incorrect data. Moreover, in the case in which the receiving apparatus is working, synchronizing with a sync signal included in the received data, the isochronization could loose and malfunction could occur.

Thus, in the case in which data is received from a transmitting medium which acquires a part of the bandwidth of transmitting medium before transmission and communicates and when the bandwidth necessary for the data transfer exceeds the bandwidth which previously acquired in the transmitting medium bandwidth, incorrect data could be supplied to the transmitting medium and when the incorrect data is supplied to the transmitting medium, the apparatus which is receiving this data induces malfunction. It is a problem.

On the other hand, like P1394, in the case in which transmission is done after acquiring a part of transmitting medium bandwidth before transmission, the other apparatuses could commence outputting, stopping the already starting communication and using the bandwidth which has been used in the stopped communication.

An example is the case in which while a first apparatus is outputting data to a transmitting medium, a second apparatus tries to start outputting data. When a bandwidth in which the second apparatus can output the data is left in the transmitting medium, the second apparatus can start outputting after acquiring the bandwidth. However, if the necessary bandwidth is not left, it can not start transmitting. Accordingly, the transmission can be started after the second apparatus secures the bandwidth necessary for outputting, making the first apparatus stop to output.

In such a case, it is necessary to start transmission after the control node once returns the bandwidth which has been used and acquires again. Because the bandwidth has to be acquired after returning the bandwidth, the apparatus to acquire the bandwidth has to confirm if the bandwidth returning is finished and keep watch on the returning action. Moreover, because it takes time from returning the bandwidth to acquiring it again, it has a risk that another node acquires the bandwidth. That is, there is a problem that a procedure necessary for acquiring the bandwidth is complex.

On the other hand, when a propagation delay depending on a connection form of the node connected to a transmitting medium occurs like P1394, a bandwidth has to be acquired including an overhead such as the propagation delay time, in addition to a bandwidth necessary for actual transmission.

In such a case, it is possible to acquire a bandwidth based on maximum propagation delay time. However, if the bandwidth to be acquired is determined on the basis of an assumed maximum propagation delay time, because an extra bandwidth which is actually unnecessary is acquired, the transmitting medium can not be effectively utilized and therefore, there is a risk to prevent the other communications which are originally to be able to communicate. That is, if the bandwidth is acquired based on the maximum value of propagation delay, there is a problem not to be able to effectively use the transmitting medium.

In a usual transmission apparatus, when information concerning smoothing buffer memory and leak rate is given in the data, it is necessary to analyze the data and extract information concerning the rate in order to determine the transmission bandwidth or the recording mode and there is a demerit that the hardware size at recording of the receiving apparatus becomes large.

Moreover, if the buffer at the receiving apparatus side overflows or under flows, the data transmission becomes impossible and usually it can not be controlled at the transmission apparatus.

DISCLOSURE OF THE INVENTION

To solve the problems described above, a data transmitting apparatus in accordance with a first invention is a transmitting apparatus to transmit, after acquiring a part of the bandwidth which a transmitting medium has, before transmission and is characterized by including:

bandwidth detection means for detecting a bandwidth of data inputted to the transmitting apparatus;

necessary bandwidth calculation means for calculating a necessary bandwidth at the transmitting medium from the bandwidth outputted from the bandwidth detection means;

transmission condition judge means for comparing the necessary bandwidth outputted from the necessary bandwidth calculation means and the acquired bandwidth acquired from the transmitting medium bandwidth and judging whether the necessary bandwidth exceeds the acquired bandwidth or not;

transmission control means for outputting the data only while the judge result outputted from the transmission condition judge means indicates that the necessary bandwidth does not exceed the acquired bandwidth; and transmission means for outputting the data outputted from the transmission control means to the transmitting medium.

A data transmitting apparatus in accordance with a second invention is a transmitting apparatus to transmit, after acquiring a part of the bandwidth which a transmitting medium has, before transmission and is characterized by including:

bandwidth detection means for detecting a bandwidth of data inputted to the transmitting apparatus;

necessary bandwidth calculation means for calculating a necessary bandwidth at the transmitting medium from the bandwidth detected at the bandwidth detection means;

transmission condition judge means for comparing the necessary bandwidth outputted from the necessary bandwidth calculation means and the acquired bandwidth acquired from the transmitting medium bandwidth and judging whether the necessary bandwidth exceeds the acquired bandwidth or not;

transmission control means for outputting the data only while the judge result outputted from the transmission condition judge means indicates that the necessary bandwidth does not exceed the acquired bandwidth;

bandwidth information adding means for adding the bandwidth outputted from the bandwidth detection means to the data outputted from the transmission control means as bandwidth information and outputting only the bandwidth information while the data is not inputted from the transmission control means; and transmission means for outputting the data outputted from the bandwidth information adding means and added with the bandwidth information to the transmitting medium.

A data receiving apparatus in accordance with a third invention is characterized by that a transmitting apparatus acquiring a part of the bandwidth of a transmitting medium before communication and, transmitting only while the bandwidth of data to be transmitted does not exceed the acquired bandwidth, provides with:

reception means for receiving the data outputted to the transmitting medium from the transmitting medium;

transmission stop detection means inputting the data received by the reception means and for detecting that the transmitting apparatus stops outputting by detecting that the data does not arrive for a specified period; and processing means for processing to respond according to the detected result which the transmission stop detection means detects.

A data receiving apparatus in accordance with a fourth invention is characterized by that a transmitting apparatus acquiring a part of the bandwidth which the transmitting medium has, before communication, transmitting the data added with the bandwidth information while the bandwidth of the transmitted data does not exceed the acquired bandwidth, and transmitting only the bandwidth information when the bandwidth of the data exceeds the acquired bandwidth provides with:

reception means for receiving the data added with the bandwidth information outputted to the transmitting medium from the transmitting medium;

transmission stop detection means inputting the data received by the reception means and for detecting that the transmitting apparatus stops to output the data by detecting that the data does not arrive for a specified period;

bandwidth information separation means inputting the data added with the bandwidth information received at the reception means and for separating the added bandwidth information from the data and outputting it; and processing means for processing to respond according to at least one of the detected result which the transmission stop detection means detects and the bandwidth information separated at the bandwidth information separation means.

A data transmitting apparatus in accordance with a fifth invention is a data transmitting apparatus in which a propagation delay occurs depending on a connection topology of the apparatus connected to the transmitting medium and a part of the bandwidth which the transmitting medium has is acquired before transmission and which is connected to a kind of transmitting medium to transmit provides with:

propagation delay identifier holding means for holding a propagation delay identifier determined by a connection topology of the apparatus connected to the transmitting medium; and maximum transmission data size holding means for holding a maximum transmission data size indicating a maximum size of the data which can hold in a packet outputting to the transmitting medium;

and is characterized by that the propagation delay identifier holding means can read and write the propagation delay identifier through the transmitting medium and the maximum transmission data size holding means can read the maximum transmission data size through the transmitting medium.

A data transmission control apparatus in accordance with a sixth invention is connected to a transmitting medium in which a propagation delay occurs depending on a connection topology of the apparatus connected to the transmitting medium and is determined by a connection topology of the apparatus connected to the transmitting medium and is a control apparatus for a transmission apparatus having propagation delay identifier holding means to hold a propagation delay identifier expressing propagation delay size of the transmitting medium and is characterized by providing with:

analyzing means for analyzing the connection topology of the apparatus connected to the transmitting medium;

identifier determining means for determining the propagation delay identifier according to the analysis result outputted from the analyzing means; and identifier setting means for setting the propagation delay identifier determined by the identifier determining means in the propagation delay identifier holding means.

A data transmission control apparatus in accordance with a seventh invention is characterized by that in a data transmission control apparatus in accordance with a sixth invention, the analyzing means have a function to judge the connection form according to the maximum number of relay apparatuses assumed from the number of apparatuses connected to the transmitting medium.

A data transmitting apparatus in accordance with an eighth invention is characterized by providing with:

measurement means for measuring the data size arrived ina specified fixed period;

bandwidth determination means for determining the transmission bandwidth from the data size measured at the measurement means; and transmission means for transmitting according to the transmission bandwidth determined at the bandwidth determination means.

A data transmitting apparatus in accordance with a ninth invention is characterized by providing with:

judge means for judging whether a transmission packet which the receiving apparatus receives from the transmission medium has passed the timing to be outputted from the receiving apparatus or not;

a counter for counting up the value when the transmitting apparatus transmits one piece of the transmission packet and counting down the value when the judge means judges that each transmission packet has passed the timing to be outputted from the receiving apparatus;

determination means for determining the transmission timing of each transmission packet so that the value counted at the counter does not exceed a certain fixed value; and transmission means for transmitting the digital data according to the transmission timing determined at the determination means.

A data transmitting apparatus in accordance with a tenth invention is a transmitting apparatus for transmitting the digital data inputted at every packet and is characterized by providing with:

calculation means for calculating a delay time from the buffer capacity provided in the receiving apparatus and the data rate of the digital data inputted to the receiving apparatus;

judge means for comparing the delay time with a specific value and judging;

transmission time stamp adding means for adding the input time to the receiving apparatus and the output of the judge means to each transmission packet as a transmission time stamp which is timing information which the receiving apparatus is to output the packet; and transmission means for transmitting the packet added with the transmission time stamp.

THE PREFERRED EXEMPLARY EMBODIMENT OF THE PRESENT INVENTION

Figure 1:
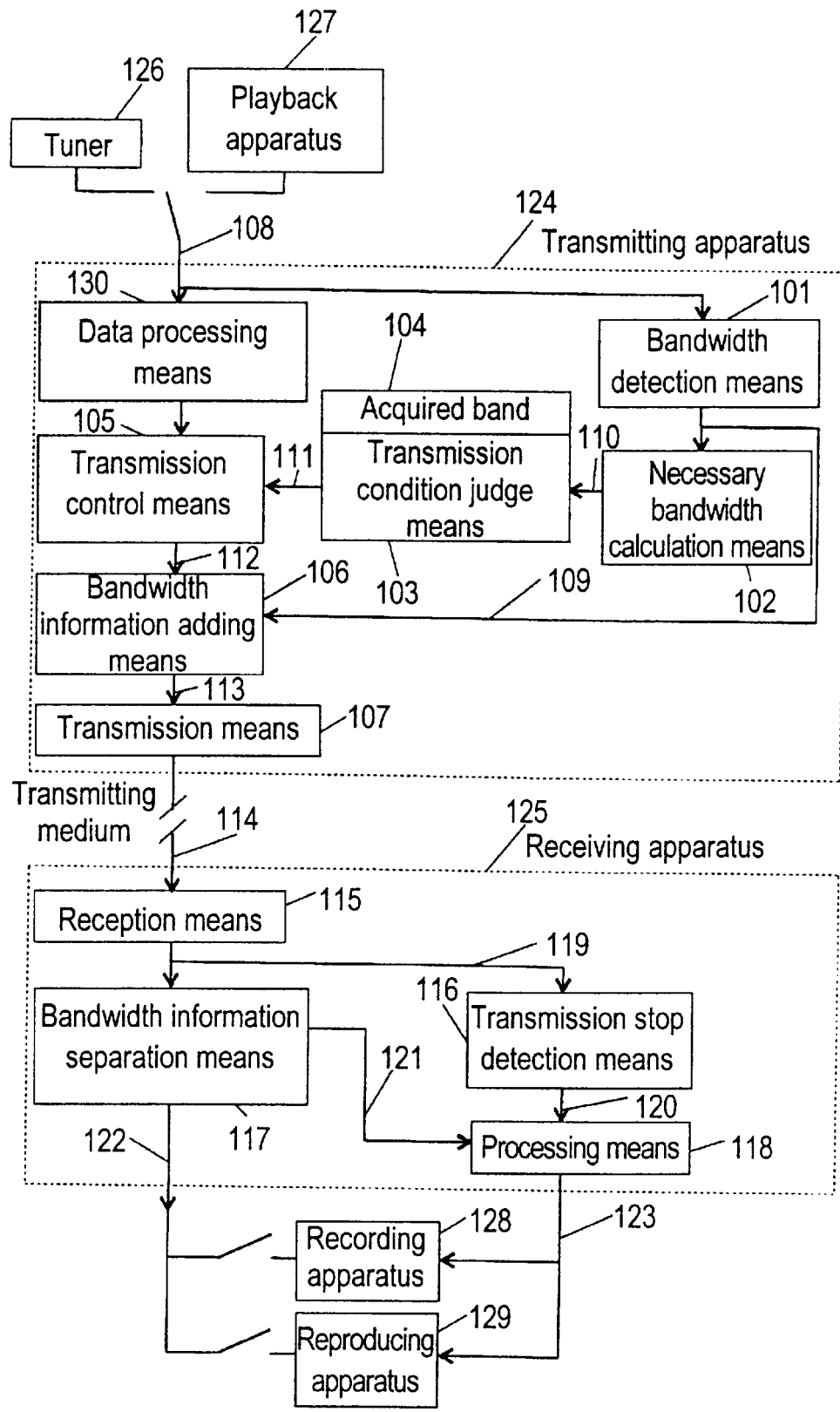
FIG. 1 is a block diagram of essential parts of a transmitting apparatus for transmitting data and a receiving apparatus for receiving transmitted data in accordance with an exemplary embodiment of the present invention.

Exemplary embodiments of the present invention are explained below, referring to the drawings.

A first exemplary embodiment of the present invention is shown in FIG. 1. In the first exemplary embodiment, a transmitting apparatus 124 to transmit data 108 to a transmitting medium 114 includes data processing means 130 for processing, for example, converting data 108 to be transmitted into a transmitting format by division or combination; bandwidth detection means 101 for detecting the bandwidth of the data 108; necessary bandwidth calculation means 102 for calculating the necessary bandwidth in transmitting medium 114 from a data bandwidth 109 detected at bandwidth detection means 101; transmission condition judge means 103 for comparing necessary bandwidth 110 calculated at necessary bandwidth calculation means 102 with acquired bandwidth 104 acquired from the bandwidth which transmitting medium 114 has, before transmission, judging a transmission condition and outputting a judged result 111; transmission control means 105 inputting the judged result and for outputting the data outputted from data processing means 130 as data 112 to be transmitted according to the judged result; bandwidth information adding means 106 for adding data bandwidth 109 outputted from bandwidth detection means 101 to data 112 outputted from transmission control means 105 as bandwidth information and outputting it; and transmission means 107 for transmitting data 113 added with bandwidth information outputted from bandwidth information adding means 106 to transmitting medium 114. Transmitting apparatus 124 is what is composed as a part of a receiver for digital television broadcast or a digital VCR and data 108 inputted to transmitting apparatus 124 is data received at a tuner 126 or data reproduced at a playback apparatus 127. As the data 108, a signal such as a MPEG2 transport stream or data of a digital VCR is inputted.

A receiving apparatus 125 for receiving data outputted from transmitting apparatus 124 through transmitting medium 114 includes reception means 115 for receiving data from transmitting medium 114 and outputting; transmission stop detection means 116 for inputting data 119 received at reception means 115, detecting that a specified time data does not arrive and outputting detected result 120; bandwidth information separation means 117 for inputting data 119 added with the bandwidth information received at reception means 115, separating bandwidth information 121 and outputting; and processing means 118 for inputting detected result 120 outputted from transmission stop detection means 116, inputting bandwidth information 121 from bandwidth information separation means 117 and processing to respond according to these inputs. Receiving apparatus 125 is what is composed as a part of a digital VCR or a television receiver and a received data 122 is supplied to an apparatus such as a recording apparatus 128 or a reproducing apparatus 129.

As a transmitting medium 114 used for transmission and reception of digital video and audio data, P1394 interface can be used.

When data 108 supplied to transmitting apparatus 124 is a MPEG2 transport stream inputted from tuner 126 or playback apparatus 127, a necessary bandwidth for outputting to transmitting medium 114 is calculated and acquired from a parameter indicating leak rate included in the transport stream, before transmission. In the case of P1394, receiving apparatus 125 receiving data from transmitting medium 114 and the other apparatuses connected to the same bus as well as transmitting apparatus 124 can acquire the bandwidth and the bandwidth used for data transmission is acquired from a node to control the bandwidth. When the apparatus to acquire the bandwidth is other than transmitting apparatus 124, a leak rate of the stream is previously inquired to transmitting apparatus 124, a necessary bandwidth is acquired based on the leak rate obtained as the result and transmission is requested for transmitting apparatus 214. The inquiry of the leak rate or the direction of the transmission can be done through asynchronous communication using the same bus. The bandwidth to be acquired here is what indicates time used in one cycle at data transmission and what a necessary bandwidth for making a packet at transmission to P1394 described later is added to the bandwidth which the leak rate indicates.

While transmitting apparatus 124 is transmitting a transport stream, bandwidth detection means 101 detects a leak rate included in the transport stream and outputs as a bandwidth data 109 of the data outputted to transmitting medium 114. Necessary bandwidth calculation means 102 which received the bandwidth data 109 of the data transmitted from bandwidth detection means 101 calculates the stream actually used at outputting to a P1394 and outputs as a necessary bandwidth 110 by adding such as a necessary bandwidth data for making a packet at transmission to the leak rate, in a similar way to acquiring the bandwidth before starting transmission.

Transmission condition judge means 103 holds an acquired bandwidth 104 acquired before transmission, compares it with a necessary bandwidth 110 inputted from necessary bandwidth calculation means 102 and outputs as a Judged result 111. Transmission control means 105 inputting the judged result 111 outputs a transport stream inputted to transmitting apparatus 124 when the judged result 111 is showing that necessary bandwidth 110 is smaller than acquired bandwidth 104 because the transmission is thought to be able to continue without any trouble and on the other hand, the stream inputted to transmitting apparatus 124 is deleted when the judged result 111 is showing that necessary bandwidth 110 is larger than acquired bandwidth 104 because continuing transmission could prevent the other isochronous transfer or asynchronous transfer.

Figure 2:
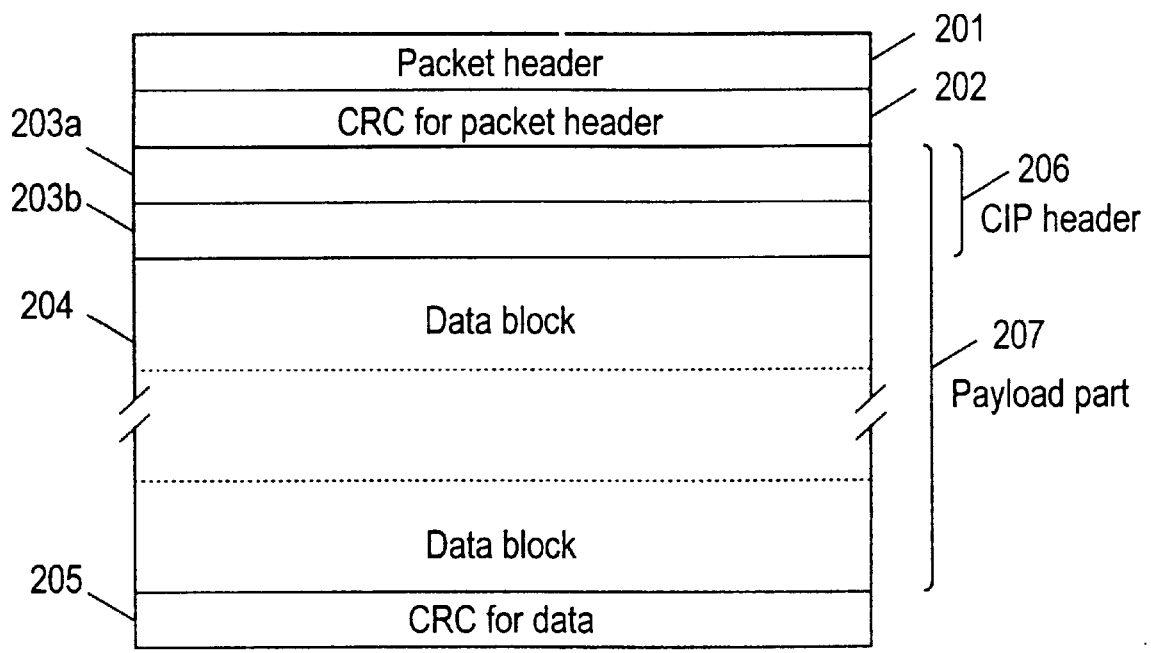
FIG. 2 shows a packet used when data is transmitted using a isochronous transfer of P1394 in accordance with an exemplary embodiment of the present invention.

Bandwidth information adding means 106 is, supplied with a transport stream 112 from transmission control means 105 and adds bandwidth data 109 which is the data supplied from bandwidth detection means 101 as bandwidth information and outputs it. At this time, while transmission control means 105 stops outputting the transport stream, only the bandwidth information is outputted. Transmission means 107 inputting transport stream 112 and bandwidth information 109 makes transport stream 112 a packet and transmits it to transmitting medium 114. A packet structure of a isochronous transfer of P1394 is shown in FIG. 2.

The packet used when the digital video and audio data are transferred using P1394 is composed of a packet header 201 used for discriminate the kinds of the packets, CRC (Cyclic Redundancy Check) 202 for the packet header added for detecting the error at the packet header at signal reception, a payload part 207, and CRC 205 for the data added for detecting error at the payload part. Payload part 207 is composed of CIP (Common Isochronous Packet) header 206 used for adding the kind of data or the bandwidth information, a plurality of data blocks 204 including video and audio data. Data 108 inputted to transmitting apparatus 124 is called source packet and is transmitted, being included in a part of the payload part 207 as it is or being divided, as a data block having a fixed size.

Figure 3:
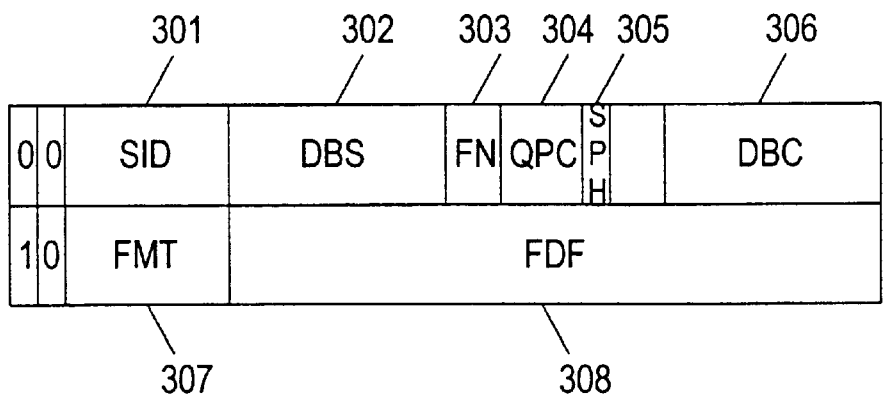
FIG. 3 shows each field structure of CIP header included in a data field of a packet used in a isochronous transfer of P1394 in accordance with an exemplary embodiment of the present invention.

CIP header 206 is composed of 4 byte data 203a including parameter concerning data transfer method and 4 byte data 203b including kinds of data and parameter necessary for each kind. A detailed structure of CIP header 206 is shown in FIG. 3. The CIP header is composed of a SID (Source node Identification number) 301 which is a identifier for identifying the node transmitting the data; DBS (Data Block Size) 302 showing a data block size; FN (Fraction Number) 303 indicating how the source packet was divided or not divided to make a data block; QPC (Quadlet Padding Count) 304 indicating the number of bytes supplied to the source packet in order to adjust the source packet size and divide; SPH (Source Packet Header) 305 indicating whether the source packet has a header based on the kinds of data or not; DBC (Data Block continuity Counter) 306 which is a counter for confirming continuity of the data block; FMT (Format) 307 indicating kinds of transmitted data; and FDF (Format Dependent Field) 308 including parameter necessary for each kind of data.

When transmission means 107 transmits a transport stream to P1394, it is indicated by FMT 307 that the signal is a MPEG2 transport stream and the bandwidth information showing a leak rate is transmitted as a part of FDF 308. As for the other fields, CIP header 206 is composed, including a suitable value and is outputted as a isochronous transfer packet. In this case, if the data which transmission means 107 receives from bandwidth information adding means 106 is a transport stream, a data block is made from the transport stream and a parameter indicating the leak rate is transferred as a part of FDF 308. On the other hand, if the data supplied by bandwidth information adding means 106 is only bandwidth information, a parameter indicating the leak rate is included in a part of FDF 308 and only the CIP header is transmitted as payload part 207, because there is no transport stream to be transmitted.

Therefore, when the bandwidth of transport stream inputted to transmitting apparatus 124 is larger than the previously acquired bandwidth 104, the transport stream can be stopped to output and it can be prevented to disturb to continue isochronous transfer and asynchronous transfer to the other apparatuses using the same bus. Moreover, because the packet of only CIP header is always transmitted even while the data is not transmitted, the receiving apparatus which received the packet can process corresponding to it. If it is a packet not including a transport stream, identification information of the transmitting apparatus is included in SID 301 and it is transferred to FMT 307 and FDF 308 that the data to be transmitted is a MPEG2 transport stream and the parameter indicating the leak rate of the stream.

On the other hand, in receiving apparatus 125 receiving a packet from transmitting medium 114, reception means 115 receives a packet for isochronous transfer from P1394 after confirming the packet header and data 119 added with bandwidth information is outputted after confirming the continuity of the data block by using CIP header. Transmission stop detection means 116 which has received data 119 detects that transmitting apparatus 124 stopped transmission by the information that the transport stream has not arrived and outputs a detection result 120. In the MPEG2 transport stream, because the maximum interval among transport stream packets included in the stream is determined, when the transport stream is not received beyond this maximum interval, it can, be judged that transmitting apparatus 124 has stopped to transmit. Even while the transport stream is not received, it can be confirmed that the transmitting medium is correctly working because the packet including only the CIP header is received. On the other hand, when the packet is not received at all, it can be thought that the transmitting medium or transmitting apparatus 124 is not correctly working.

Bandwidth information separation means 117 is inputted with the data to which the bandwidth information supplied from reception means 115 is added, separates into bandwidth information 121 and data 122 and outputs them separately. When the data supplied from reception means 115 is only bandwidth information, bandwidth information 121 is outputted. The transport stream included in data 122 outputted from bandwidth information separation means 117 is recorded at a recording apparatus 128 or reproduced into video and audio signals at reproducing apparatus 129.

Processing means 118 processes based on detection result 120 supplied from transmission stop detection means 116 and bandwidth information 121 supplied from bandwidth information separation means 117. When detection result 120 indicating transmission stop of transmitting apparatus 124 is inputted, processing means 118 directs to stop the works, because neither recording apparatus 128 can give a correct recording action nor reproducing apparatus 129 can give a normal reproducing action.

When an effective transport stream is not supplied from transmitting medium 114, because neither there is data for recording or reproducing nor isochronization information included in the transport stream is given, the isochronization of the receiving apparatus is disturbed and malfunction could be occur. When transmitting apparatus 124 stops outputting the transport stream, processing means 118 directs to stop recording and reproducing actions and worthless recording and reproducing actions can be prevented and malfunction is also prevented.

Processing means 118 is supplied with bandwidth information 121 from bandwidth information separation means 117 and watches the leak rate of the transport stream under reception. Recording apparatus 128 recording a transport stream can determine the rate at recording based on the leak rate of the transport stream. While recording is made receiving the transport stream, if the leak rate of the transport stream under reception comes to exceed the recording rate, it becomes not to continue a correct recording. Therefore, processing means 118 outputs a signal 123 to direct recording to recording apparatus 128 and can continue recording action by stopping recording or varying the recording rate at recording apparatus 128.

Even a packet not including a transport stream, because identification information of transmitting apparatus 124 can be obtained from the SID value included in the CIP header, it is possible to direct transmitting apparatus 124 to stop transmission and when the apparatus which acquired a bandwidth of transmitting medium 114 is receiving apparatus 125 and transmitting apparatus 124 is stopping transmission as a result of that the leak rate varies and the necessary bandwidth exceeds the acquired bandwidth, it becomes possible that receiving apparatus 125 acquires a lacked bandwidth and makes transmitting apparatus 124 start to transmit again.

When data 108 supplied to transmitting apparatus 124 is digital VCR data supplied from playback apparatus 127, the bandwidth necessary for transmitting to transmitting medium 114 is calculated and acquired before transmission, depending on which the kind of video signal is an SD video signal or an HD video signal. Because the digital VCR data is data having a fixed rate, it is possible to determine the bandwidth based on the kind of video signal. Similar to a MPEG2 transport stream, the other apparatuses than the apparatus to transmit can also acquire the bandwidth. In this case, the kind of transmitted video signal is previously inquired.

When transmitting apparatus 124 is transmitting the digital VCR data, bandwidth detection means 101 detects whether the kind of video signal is an SD video signal or an HD video signal and outputs bandwidth information 109 of the data necessary for outputting to transmitting medium 114. Necessary bandwidth calculation means 102 which has received bandwidth information 109 which is transmitting data from bandwidth detection means 101 adds the bandwidth which is necessary according to making a packet at transmission or the like to the data bandwidth, in a similar way to acquiring the bandwidth before starting transmission and the bandwidth actually used at outputting the data to P1394 is calculated and is outputted as a necessary bandwidth 110.

Transmission condition judge means 103 holds acquired bandwidth 104 acquired before transmission, compares it with necessary bandwidth 110 supplied from necessary bandwidth calculation means 102 and outputs judged result 111. Because it is thought that it gives no trouble to continue transmission when judged result 111 is smaller than occupied bandwidth 104, transmission control means 105 inputting judged result 111 outputs the digital VCR data inputted to transmitting apparatus 124. On the other hand, because continuing transmission could prevent the other isochronous or asynchronous transfer when necessary bandwidth 110 is larger than acquired bandwidth 104, transmission control means 105 deletes the inputted data to transmitting apparatus 124.

Bandwidth information adding means 106 inputs the digital VCR data from transmission control means 105 and adds the bandwidth information which is the data supplied from bandwidth detection means 101 as bandwidth information and outputs it. In this case, while transmission control means 105 stops outputting the data, it outputs only bandwidth information. Transmission means 107 inputting the digital VCR data and bandwidth information supplied from bandwidth information adding means 106 is made into a packet and is outputted to transmitting medium 114.

The packet for isochronous transfer used on P1394 in this case has the same structure as a packet used for transferring a MPEG2 transport stream. When transmission means 107 transmits digital VCR data to P1394, it is indicated to be digital VCR data by FMT 307, information which the video signal is an SD video signal or an HD video signal is transmitted as a part of FDF 308. Because the digital VCR data has a fixed rate, it has the same effect as expressing the data bandwidth by identifying information which an SD video signal or an HD video signal is. As for the other fields, CIP header 206 is composed including an appropriate value and is transmitted as a packet for isochronous transfer. In this case, at transmission means 107, when the data received from bandwidth information adding means 106 is data added with the bandwidth information, a data block is made from the digital VCR data and parameter expressing a kind of video signal is transferred as a part of FDF 308. On the other hand, when the data received from bandwidth information adding means 106 is only bandwidth information, the parameter expressing a kind of video signal is included in a part of FDF 308 and only a CIP header is transmitted as payload part 207 because of no data to transmit.

Thus, because the data of digital VCR data inputted to transmitting apparatus 124 changed from an SD video data into an HD video data, if the bandwidth necessary for transmission becomes larger than the previously acquired bandwidth 104, the transmission of the digital VCR data can be stopped and it can be prevented to disturb to continue isochronous or asynchronous transfer of the other apparatuses using the same bus. Moreover, similar to the case of transport stream transfer, because the packet of only the CIP header is always transmitted, the receiving apparatus receiving this packet can process correspondingly. Even if it is a packet not including data, identification information of the transmitting apparatus is included in SID 301 and it is transferred to FMT 307 and FDF 308 that the data to transmit is digital VCR data and information which the data is an SD video data or an HD video data.

At receiving apparatus receiving a packet from transmitting medium 114, transmission means 115 receives a packet for isochronous transfer from P1394 after confirming a packet header and outputs digital VCR data 119 to which bandwidth information is added after confirming continuity of the data block, using CIP header. Transmission stop detection means 116 receiving data 119 detects that transmitting apparatus 124 has stopped transmission from no arriving of the data for a previously determined period and outputs detection result 120. Similarly to receiving a transport stream, it can be confirmed that the transmitting medium is correctly working even if for a period the data is not received because the packet including only CIP header is received. On the other hand, when the packet is not received at all, it is thought that the transmitting medium or transmitting apparatus 124 is not correctly working.

Bandwidth information separation means 117 is supplied data to which bandwidth information is added from reception means 115, separates into bandwidth information 121 and data 122 and outputs them separately. When the data received from reception means 115 is only bandwidth information, only bandwidth information 121 is outputted. The digital VCR data outputted from bandwidth information separation means 117 is recorded at recording apparatus 128 or reproduced into video and audio signals at reproducing apparatus 129.

Processing means 118 processes the data based on detection result 120 supplied from transmission stop detection means 116 and bandwidth information 121 supplied from bandwidth information separation means 117. When detection result 120 directing transmission stop to transmitting apparatus 124 is inputted, because recording apparatus 128 can not correctly record and also reproducing apparatus 129 can not correctly reproduce, processing means 118 directs to stop these actions.

When effective digital VCR data is not received from the transmitting medium, because not only there is no data for recording or reproducing but also isochronization information transferred together with the data is not received, the receiving apparatus could loose isochronization and malfunction could occur. When transmitting apparatus 124 stops transmission of the data, processing means 118 directs to stop recording and reproducing and worthless recording and reproducing as well as malfunction can be prevented.

Processing means 118 inputs bandwidth information 121 from bandwidth information separation means 117 and watches which kind of digital VCR data the signal under reception is. Recording rate of recording apparatus 128 has to be decided depending on the kind of digital VCR data. When the receiving data changes from an SD video signal to an HD video signal or vice versa while it is recording the receiving data, correct recording becomes impossible. Recording can be continued by directing to stop recording or to change the recording rate to recording apparatus 128.

Even if it is a packet not including digital VCR data, because the identification information of transmitting apparatus 124 can be obtained from the SID value included in the CIP header, when transmitting apparatus 124 is directed to stop transmission or an apparatus acquiring the bandwidth of transmitting medium 114 is receiving apparatus 125 and the kind of data changes to another kind and transmitting apparatus 124 stops transmission due to that the necessary bandwidth exceeds the acquired bandwidth, receiving apparatus 125 supplements an insufficient bandwidth and thus, transmitting apparatus 124 becomes to be able to start transmission again.

The variation of the bandwidth necessary for such a transmission is thought to occur when the transmitting data varies from a MPEG2 transport stream to digital VCR data or vice versa. Even when such a kind of data varies, transmitting apparatus 124 becomes to be able to start transmission again by comparing the necessary bandwidth at transmission with the bandwidth acquired from the transmitting medium and judging a transmitting condition.

Because it can know a kind of data from the CIP header included in the receiving packet, receiving apparatus 125 can vary a recording method of recording apparatus 128 when the receiving data changes from a MPEG2 transport stream to digital VCR data or vice versa or can stop recording if the newly received data cannot recorded. In such a case, it is possible to stop reproducing when a corresponding reproducing method is switched or newly received data can not be reproduced. Moreover, when an apparatus directing data transmission is a receiving apparatus 125 and there is no need of continuing communication because the received data can not be recorded nor reproduced, it is possible to direct transmitting apparatus 124 to stop transmission.

Even it has no bandwidth information adding means 106 and bandwidth information separation means 117, transmitting apparatus 124 prevent from transmitting over the acquired bandwidth and it is possible to prevent to disturb continuing isochronous and asynchronous communication other than communication using the same transmitting medium 114. Receiving apparatus 125 detects the stop of transmission from transmitting apparatus 125, stops recording and reproducing and can prevent malfunction.

A construction of bandwidth detection means and data processing means is described below.

Figure 10:
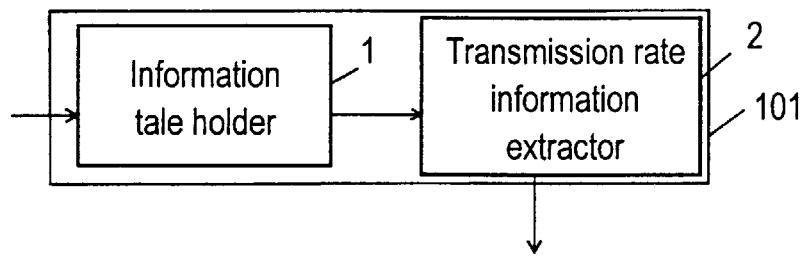
FIG. 10 is a block diagram of a first example of a bandwidth detection means in accordance with an exemplary embodiment of the present invention.

FIG. 10 is a first example of a block diagram of bandwidth detection means.

Bandwidth detection means 101 is composed of a information table holder 1 and a transmission rate information extractor 2.

The inputted transport stream packet header of MPEG2 is analyzed and information tables such as a programming mapping table (PMT) and an event information table (EIT) are extracted and held at an information table holder 1. Program names, broadcast time, rate information and the like are written in these tables.

Information about transmission rate, for example smoothing buffer descriptor in the PMT is extracted at transmission rate information extractor 2. The transmission bandwidth is determined based on the extracted information at necessary bandwidth calculation means 102.

Figure 11:
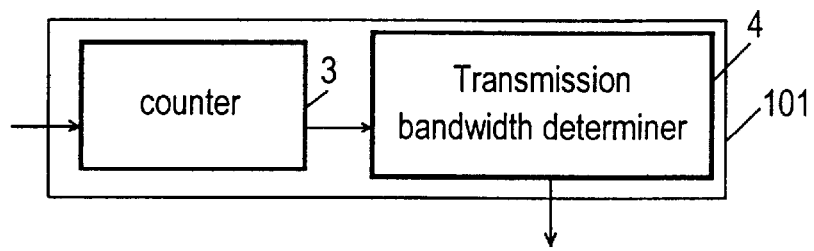
FIG. 11 is a block diagram of a second example of a bandwidth detection means in accordance with an exemplary embodiment of the present invention.

FIG. 11 is a second example of a block diagram of bandwidth detection means. This is used when transport stream packet of MPEG2 has no transmission rate information or when the analyzing load in the data is desired to reduce. The block 3 is a counter and the block 4 is a bandwidth determiner in bandwidth detection means. 101 shown in FIG. 11.

Counter 3 counts the data size (here, the number of data packets) one after another, supplied to the transmitter during a fixed period, for example, a period as long as 24.576 MHz which is a working clock of IEEE 1394. Because the data packet size is a fixed number, that is 188 bytes in MPEG2 transmission, it is comparatively easy to find an average rate.

Bandwidth determiner 4 can catch the average rate per period from the value counted by counter 3. The average rate is selected one from a plurality of transmittable bandwidths which the transmitter has. At determination of the transmission bandwidth, transmission ,bandwidth determiner 5 selects the narrowest transmission bandwidth, considering a rate which is larger by a fixed rate (for example, 1.2 times) than the average rate caught at bandwidth determiner 4 and within a range which can absorb jitter due to deviation of data arrival timing and the like. To secure the selected transmission bandwidth, a transmission packet including bandwidth secure request information is transmitted to the transmission medium.

The rata rate can be directly known by the above operation without analyzing inside the signal of MPEG2 and the transmission bandwidth can be easily determined using it. The information concerning the determined data rate can be transmitted by newly writing in the table.

Figure 12:
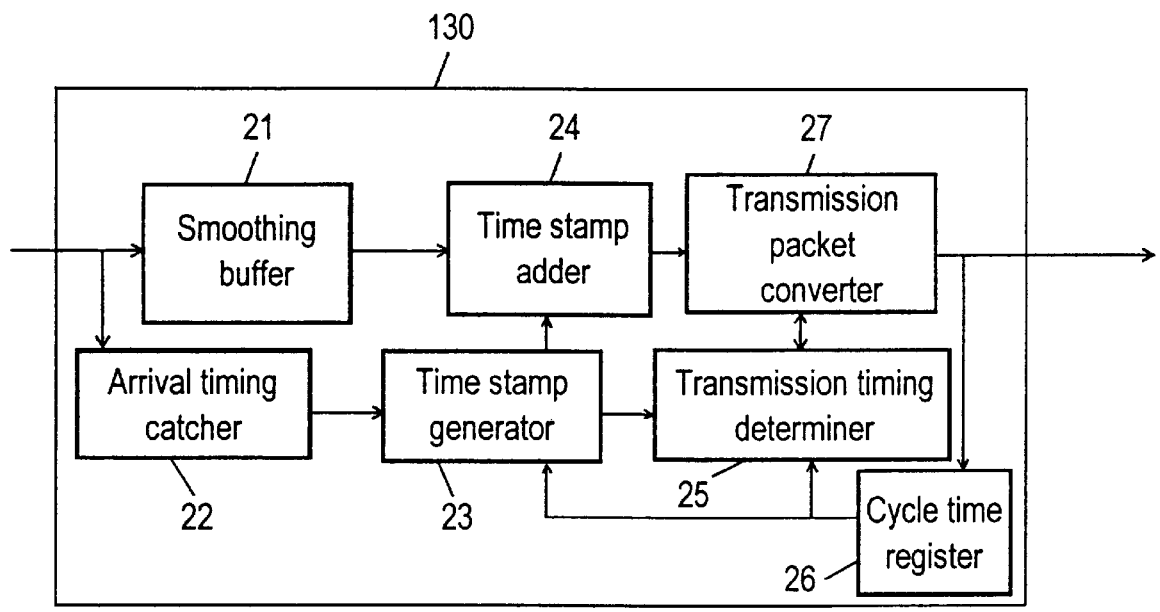
FIG. 12 is a block diagram of a data processing means in accordance with an exemplary embodiment of the present invention.

FIG. 12 shows a block diagram of data processing means. In data processing means 130, the block 21 is a smoothing buffer, the block 22 is an arrival timing catcher, the block 23 is a time stamp generator, the block 24 is a time stamp adder, the block 25 is a transmission timing determiner, the block 26 is a cycle time register (CTR) and the block 27 is a transmission packet converter.

Figure 14:
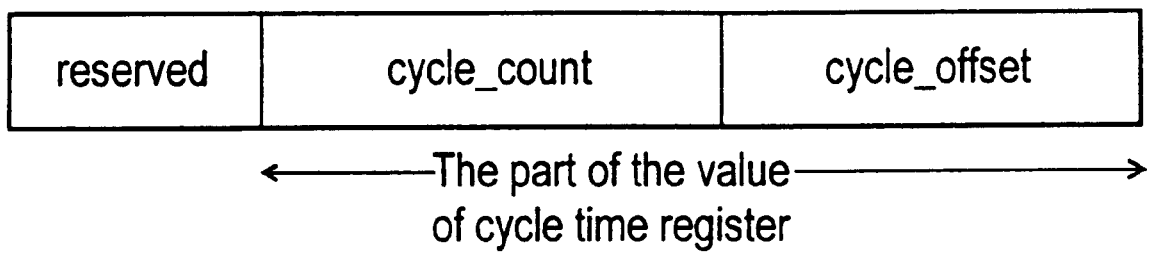
FIG. 14 shows a structure of a transmission time stamp in accordance with an exemplary embodiment of the present invention.

The time stamp of the transmission is generated based on the counted value of CTR 26 which is a clock set the time among the apparatuses connected to the transmission medium. Arrival timing when each transport stream packet of MPEG2 is supplied from tuner 126 or playback apparatus 127 is outputted from a decoder box of MPEG2 or the like to the transmitting apparatus is acquired at arrival timing catcher 22. Time stamp generator 23 latches the value of CTR 26 at arrival timing and generates transmission time stamp, adding the counted value of the maximum delay time between the designated transmitting apparatus and receiving apparatus. Transmission time stamp is added at the top of the data block. An example of the format is shown in FIG. 14.

The inputted transport stream packet is added with the transmission time stamp and is converted into a data block at time stamp adder 24 after being stored at smoothing buffer 21 and then is converted into a transmission packet in which a plurality of data blocks gather at transmission packet converter 27. The transmission packet is sometimes converted after dividing into some data blocks by the rate or the like.

Figure 13:
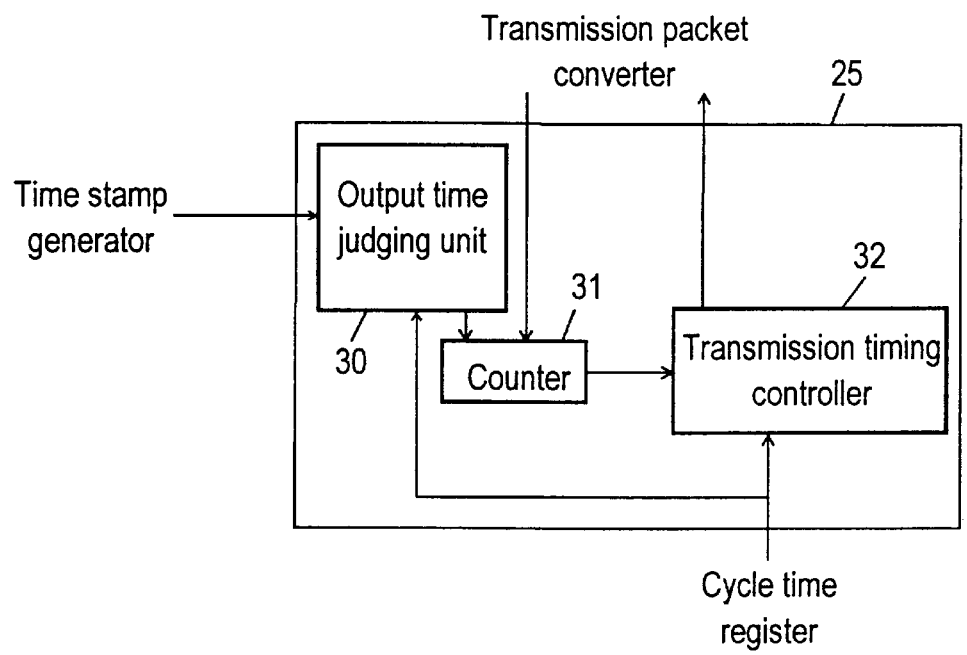
FIG. 13 is a block diagram of a transmission timing determiner in accordance with an exemplary embodiment of the present invention.

FIG. 13 shows a block diagram of a transmission timing determiner 25. The block 30 is an output time judging unit, the block 31 is a counter and the block 32 is a transmission timing controller. The timing actually transmitted from transmission packet converter 27 to the transmission medium is controlled at transmission timing determiner 25.

Output time judging unit 30 is supplied with time stamp value indicating the output time at the receiver of each data packet from time stamp generator 23 and holds them and then, compares each time stamp value with the present CTR value and judges if the data packet was already outputted from the receiver.

The CTR values of the receiving apparatus and the transmitting apparatus are the same because they are set so as to be equal against every node connected. Therefore, the above judgment is enough only comparing between two values.

Counter 31 counts down one by one for a data packet and counts up one by one at every time when a data packet is transmitted from transmission packet converter 27 when output time judging unit 30 judges to be already outputted". That is, the counted value becomes the same as the number of data packets in the buffer of the present receiver. Transmission timing controller 32 outputs a signal to control the output timing from transmission packet converter 27 according to the output from counter 31. That is, when the count value becomes large and almost becomes to exceed a fixed value (concretely, the ratio of buffer size/data packet size), the output from transmission packet converter 27 to the transmission means is delayed. When the counted value approaches zero, the output from transmission packet converter 27 to the transmission means is advanced. Controller 32 can be composed of a microcomputer and software or the like according to the above concept. According to the above process, transmission timing determiner 25 can be controlled at the transmission apparatus so that the buffer at the receiving apparatus side does neither overflow nor under flow. The receiving apparatus can output a signal to a recording apparatus and the like with a correct timing, without overflowing of the buffer in the receiving apparatus, by outputting the signal with a timing described in the transmission time stamp. The counted value is controlled so as to be as large as possible within a range not to exceed the above fixed value. By this control, the number of data packets in the receiver buffer becomes maximum without overflowing and it becomes possible not to interrupt the output in the receiving apparatus as many as possible when some trouble occurs in the receiving apparatus or on the transmission medium and the transmission packet does not arrive in the receiving apparatus for a certain period.

Figure 4:
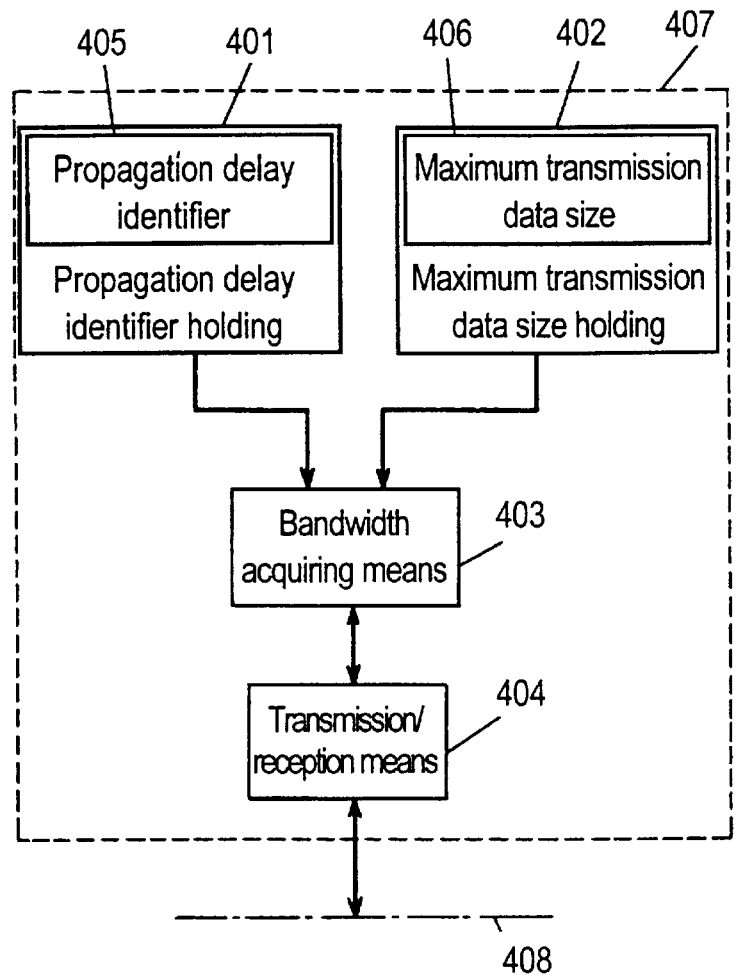
FIG. 4 is a block diagram of an essential part of a transmitting apparatus for transmitting isochronization data in accordance with an exemplary embodiment of the present invention.

In the second exemplary embodiment, data transmitting apparatus 407 transmitting isochronous data to transmitting medium 408 shown in FIG. 4 is composed of a propagation delay identifier holding means 401 holding a propagation delay identifier 405, maximum transmission data size holding means 402 holding a maximum transmission data size 406, bandwidth occupying means 403 and transmission/reception means 404.

Figure 5:
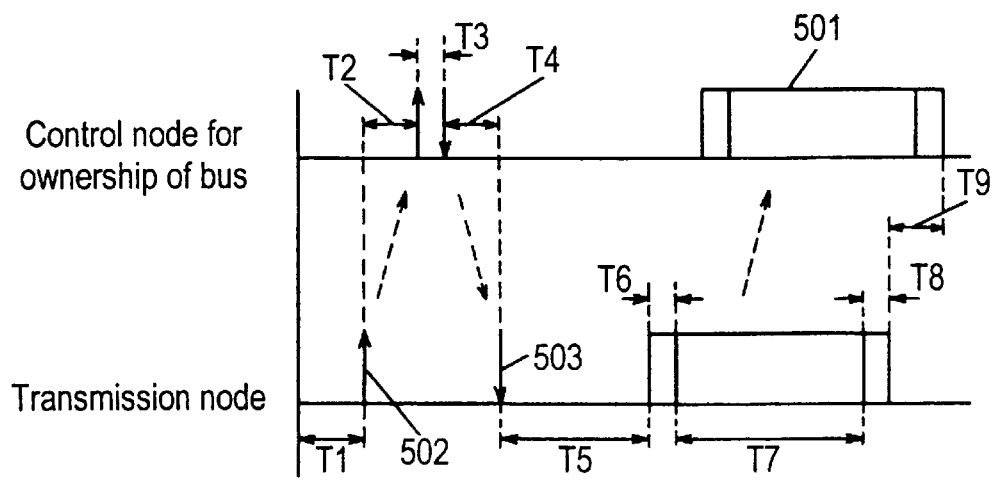
FIG. 5 shows a bandwidth necessary to acquire when isochronization data of P1394 is transmitted in accordance with an exemplary embodiment of the present invention.

FIG. 5 shows a necessary bandwidth to acquire when transmitting isochronous data to P1394. The bandwidth of the isochronous data is a bandwidth corresponding to a time determined by a total time of time T1 from detecting that the bus is not yet used to requesting ownership, a transmission time T2 necessary for that the request of the ownership of bus arrives at the control node, a judge time T3 at the control node of ownership of bus, a transmission time T4 necessary for receiving a judge result outputted from the control node of ownership, an occupying period T5 of the bus before data transmission, time T6 for outputting a signal indicating transmission rate of the data, time T7 necessary for transmitting a packet itself, time T8 for outputting a signal indicating transfer finish and a propagation delay time T9 necessary for that the packet arrives at the node controlling ownership of bus.

In this bandwidth, the value other than T7 which is a time necessary for transferring the packet itself is independent of transmission rate and transmitting data size and is determined by the number of relay nodes existing between the transmitting node and the node controlling the ownership of bus. In P1394, because there is no need that the node controlling the ownership of bus exists on the center of the connection, time exceeding the packet transfer time is different from node to node. In order to obtain time for each node, the location of the node controlling ownership of bus on the bus must be considered.

However, when this time is obtained as a value independent of the location of the control node of ownership and the same value is used for every node connected to the bus, it is good that the number of maximum relay nodes existing in the bus is used as the number of maximum relay nodes between the transmission node and the node controlling ownership of bus.

Figure 6:
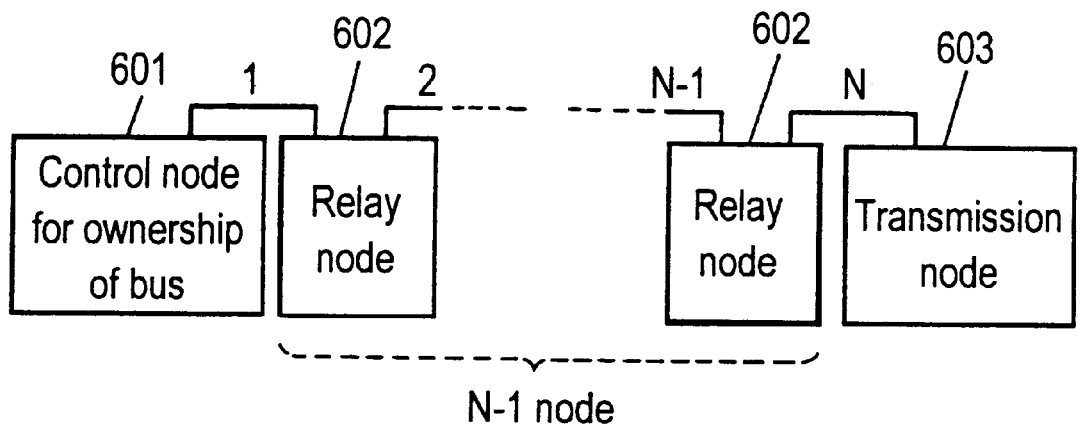
FIG. 6 shows a connection of the nodes apart by (N–1) pieces of relay nodes in N time connections in accordance with an exemplary embodiment of the present invention.

Therefore, considering that transmission node 603 apart from node 601 controlling ownership of bus by (N−1) pieces of relay node 602 with N times of connection as shown in FIG. 6 outputs a packet and using the value indicated in the standard of P1394, the time Toh used for other than packet transfer is expressed by Eq. 1.

$$Toh = (1.797 + N \times 0.494) \text{ microseconds} \quad \text{(Eq. 1)}$$

Expressing this value by a unit used for bandwidth control in P1394, the bandwidth BWoh necessary for other than packet transfer bandwidth(overhead bandwidth, hereafter) can be expressed by Eq. 2.

$$BWoh = 88.3 + N \times 24.3 \qquad \text{(Eq. 2)}$$

The unit of the bandwidth used in P1394 is a value regarding a bandwidth necessary for transferring a 2 bit signal at transfer speed of 100 Mbps as 1.

Propagation delay identifier 405 is obtained from a connection topology of the apparatus connected to transmitting medium 408 and the overhead bandwidth can be determined as only one value by the value of this identifier. Propagation delay identifier 405 held in propagation delay identifier holding means 401 is determined at an initial condition, based on the number of maximum connections allowed for the used transmitting medium.

When the used transmitting medium is P1394, value corresponding to an overhead bandwidth having 15 relay nodes with 16 times of connections is set. On the other hand, maximum transmission data size 406 held in maximum transmission data size holding means 402 expresses the maximum data size which can be included in a payload part which is a data part of a packet for isochronous communication used at P1394. Maximum transmission data size 406 used here expresses what is equivalent to acquired bandwidth 104 described in the first exemplary embodiment.

The packet format used in a isochronous data transmission is the same format as that shown in FIG. 3 of the previous exemplary embodiment. The sizes and the number of data blocks included in the payload part are determined by kind and rate of the transmitted data.

Data of 20 bytes including packet header is added to the packet in addition to the isochronous data. Among these, what is held in maximum transmission data holding means is a summation of 8 bytes of CIP header 206 and the data size of the isochronous data. Accordingly, the bandwidth necessary for acquisition before transmission is a summation of a bandwidth necessary when a packet having a size which 12 bytes are added to the maximum transmission data size is transmitted at a rate used for transmission and the above-mentioned overhead bandwidth.

Figure 7:
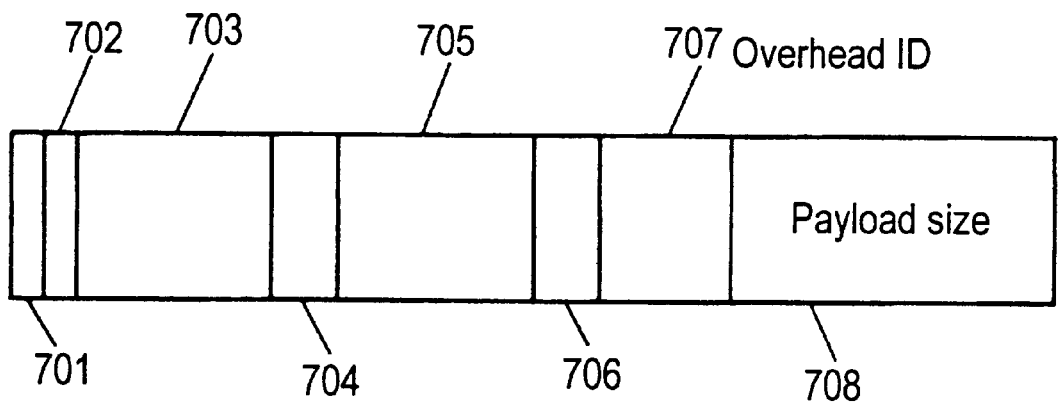
FIG. 7 shows a construction of PCR which is a register to control transmission of the isochronization data in accordance with an exemplary embodiment of the present invention.

FIG. 7 shows a composition of a transmission PCR (Plug Control Register) which is a register for controlling isochronous data transmission and is located in an address space which each node of P1394 has. The PCR is a 32 bit register and is composed of a 1 bit on-line identifier 701 indicating if the PCR is usable, a 1 bit broadcast connection counter 702 indicating that transmission controlled by the transmission PCR can stop during transmission, a 6 bit point-to-point connection counter 703 indicating the number of apparatuses which directed the PCR, a 2 bit unused field 704, a channel 705 indicating a channel number used for transmission of 6 bit isochronous data, a 2 bit data rate 706 indicating a rate used for transmission, a 4 bit overhead ID 707 corresponding to propagation delay identifier holding means, and a 10 bit payload size 708 corresponding to maximum transmission data size holding means and expressing the payload size by a unit of 4 bits.

In the first exemplary embodiment, payload size 708 of the PCR can be used as an acquired bandwidth 104.

The transmission control apparatus to control transmission can control transmission by writing values in the register and can know a transmission condition at that time by reading the values in the register. The transmitting apparatus executes transmission when a value other than zero is written in broadcast connection counter 702 or point-to-point connection counter 703, while on-line identifier 701 of transmission PCR is 1. On the contrary, when both are 0, the outputting is stopped. Only when point-to-point connection counter 703 is 0 and broadcast connection counter 702 is 1, the apparatuses other than the apparatus directed start of transmission clear up broadcast connection counter 702 and can stop the transmission.

Because propagation delay identifier 405 could have been changed to a different identifier by a reason mentioned later when bandwidth acquiring means 403 acquires the bandwidth, the bandwidth is acquired based on propagation delay identifier 405 held in propagation delay identifier holding means 401 and maximum transmission data size 406 held in maximum transmission data size holding means 402. When the bandwidth is acquired, bandwidth acquiring means 403 reads maximum transmission data size 406 from maximum transmission data size holding means 402 and adds 12 bytes to maximum transmission data size 406 and acquires the bandwidth necessary for transmitting a packet of this size at data rate 706 included in the PCR, to obtain a packet size from the payload size by the reason mentioned above. Bandwidth acquiring means 403 reads propagation delay identifier 405 from propagation delay identifier holding means 401 and adds the overhead bandwidth determined by propagation delay identifier 405 to the bandwidth for packet transmission.

Bandwidth acquiring means 403 outputs the bandwidth acquired from the above result to transmission/reception means 404 as a request for bandwidth assignment and transmission/reception means 404 outputs the received request for bandwidth assignment to transmitting medium 408 as an asynchronous packet to send a bandwidth control node. As the request result, the received packet is outputted to bandwidth acquiring means 403. Bandwidth acquiring means 403 judges if the bandwidth was acquired from the request result for bandwidth assignment. Transmission start can be directed by writing in broadcast connection counter 702 of PCR or point-to-point connection counter 703, based on the result of acquiring the bandwidth.

Concerning the above procedure, an example of bandwidth assignment aiming transmission of digital VCR data which is now under development is explained below.

When the digital VCR data is transmitted using P1394, the data is divided at every 480 bytes and is transferred as a isochronous packet. Accordingly, the value of 122, which 488 bytes is expressed as a unit of 4 bytes, is written as a maximum transmission data size, where the value of 488 bytes is a value which 8 bytes of CIP header is added to the dividing unit of 480 bytes.

Bandwidth acquiring means 403 reads out the value 122 which is a maximum transmission data size from maximum transmission data size holding means (payload size 708) included in PCR and multiplies it by 4 times and it is known that the payload size is 488 bytes. Further, it is found out that the value 500 bytes added with 12 bytes to 488 bytes is a size of a packet for isochronization data. Still further, a bandwidth necessary for a packet transmission is found based on the value of data rate 706 included in PCR. The bandwidth becomes 2000, using a bandwidth unit used in P1394 when data rate 706 is indicating a transfer at 100 Mbps. On the other hand, the bandwidth becomes 1000, which is a half of 2000 when data rate 706 is indicating a transfer at 200 Mbps.

Bandwidth acquiring means 403 reads out a propagation delay identifier from propagation delay identifier holding means (overhead ID 707) included in the PCR. Bandwidth acquiring means 403 has a correspondence table of overhead pattern versus bit pattern of a 4 bit propagation delay identifier shown in Table 1 and the overhead bandwidth is found from the propagation delay identifier read out.

TABLE 1

| propagation delay identifier | overhead bandwidth |
|---|---|
| 0000 | 113 |
| 0001 | 137 |
| 0010 | 162 |
| 0011 | 166 |
| 0100 | 210 |
| 0101 | 235 |
| 0110 | 259 |
| 0111 | 283 |
| 1000 | 307 |
| 1001 | 332 |
| 1010 | 356 |
| 1011 | 380 |
| 1100 | 405 |
| 1101 | 429 |
| 1110 | 453 |
| 1111 | 477 |

The summation of the overhead bandwidth obtained as a result and the value 2000, which is a packet bandwidth is an acquired bandwidth.

When point-to-point counter 703 of the PCR is 0 and broadcast connection counter 702 is 1, because the transmission can be stopped by that the other nodes than that directs to start transmission clears broadcast connection counter 702, a different transmission can be made by using the bandwidth used in the stopped transmission. At this time, the used bandwidth is known from the propagation delay identifier included in the PCR and the maximum transmission size.

Figure 8:
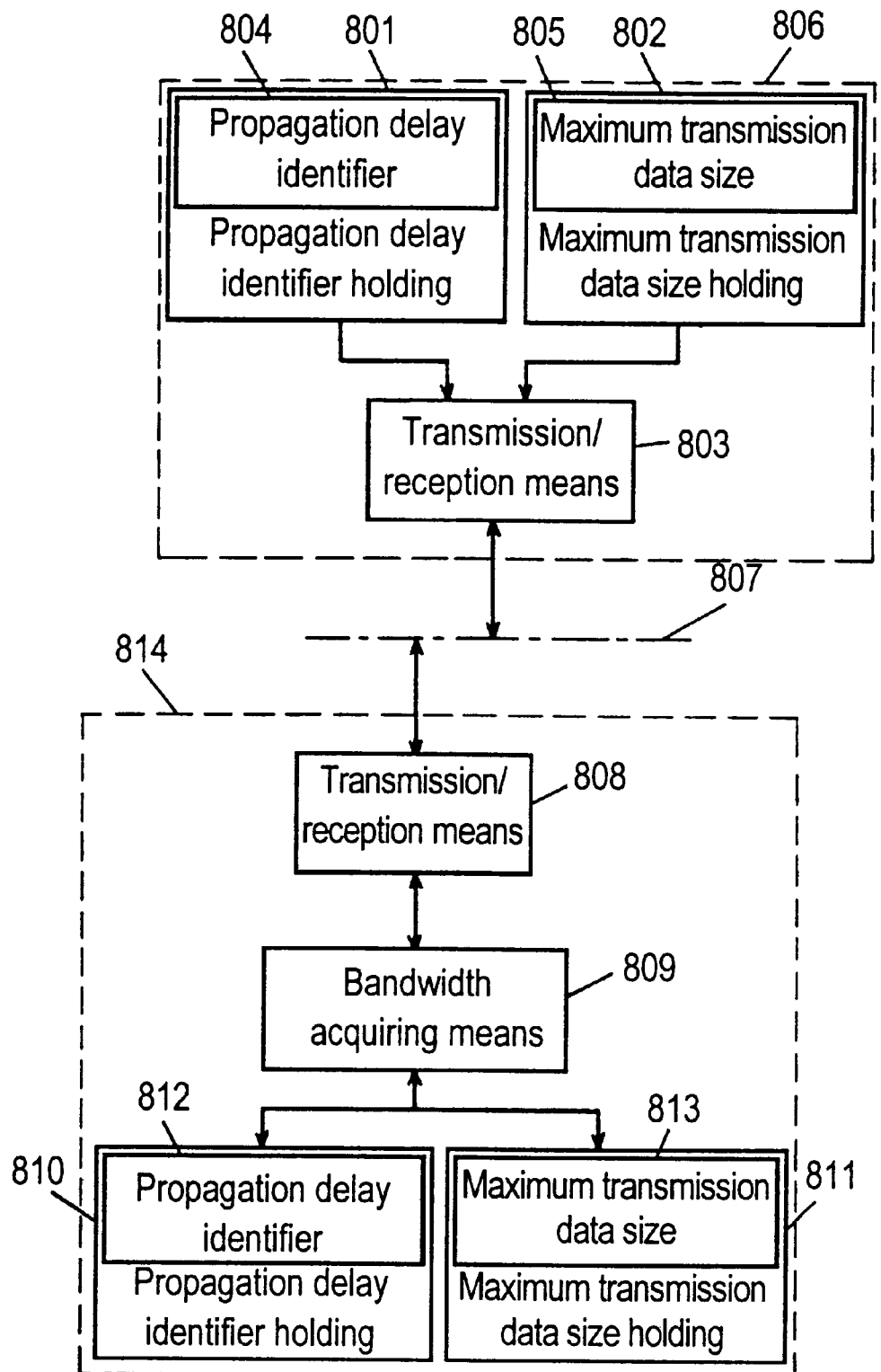
FIG. 8 is a block diagram of essential parts of two transmitting apparatuses when transmission nodes of the isochronization data are switched in accordance with an exemplary embodiment of the present invention.

A block diagram of a transmitting apparatus at such a switching of transmission is shown in FIG. 8. In FIG. 8, a first transmitting apparatus 806 which is now transmitting is composed of propagation delay identifier holding means 801 holding a propagation delay identifier 804, maximum transmission data size holding means 802 holding a maximum transmission data size 805, and transmission/reception means 803 transmitting and receiving a packet between transmission/reception means 803 itself and transmitting medium 807. A second transmitting apparatus 814 which newly starts transmission is composed of transmission/reception means 808 transmitting and receiving a packet between transmission/reception means 808 itself and transmitting medium 807, bandwidth acquiring means 809, propagation delay identifier holding means 810 holding a propagation delay identifier 812, and maximum transmission data size holding means 811 holding a maximum transmission data size 813.

When second transmitting apparatus 814 stops transmission of first transmitting apparatus 806 and transmits using the bandwidth which first transmitting apparatus 806 was using, broadcast connection counter of the PCR of first transmitting apparatus is cleared. At this time, bandwidth acquiring means 809 of second transmitting apparatus reads out propagation delay identifier 804 held in propagation delay identifier holding means 801 composed as a part of the PCR of first transmitting apparatus 806 and maximum transmission data size 805 held in maximum transmission data size holding means 802.

In this case, because the node ID of first transmitting apparatus 806 is included in the CIP header of the packet for isochronous data which has a composition shown in FIG. 3 and is transmitted by the first transmitting apparatus, second transmitting apparatus 814 can specify the node ID of first transmitting apparatus 806 which is transmitting the data by once receiving the data which is now being transmitted and checking the CIP header.

Thus, bandwidth acquiring means 809 of second transmitting apparatus 814 looks for the bandwidth which the first transmitting apparatus acquired and was using in a similar way to the above-mentioned usual bandwidth acquiring way, based on propagation delay identifier 804 and maximum transmission data size 805 read out from first transmitting apparatus 806. The bandwidth found here, which has been acquired by first transmitting apparatus 806, can be used by second transmitting apparatus 814 after first transmitting apparatus 806 stops transmission.

Although the data rate used when the bandwidth used by first transmitting apparatus 806 is found is usually used reading out data rate 706 included in the PCR, because it can be known from the reception rate when a packet for isochronous data is received in order to know the node ID of first transmitting apparatus 806, it is not always necessary to read out data rate 706 included in the PCR.

Bandwidth acquiring means 809 compares the given bandwidth acquired by the above procedure with the bandwidth which is similarly acquired from propagation delay identifier 812 held in second transmitting apparatus 814 and maximum transmission data size 813 held in maximum transmission data size holding means 811 and is planned to use and when there is any difference between the given bandwidth and the bandwidth planned to use it is necessary to return an extra bandwidth to the control node of the bandwidth or on the contrary, an insufficient bandwidth is newly acquired.

In this case, when propagation delay identifier 804 read-out from first transmitting apparatus 806 is smaller than propagation delay identifier 812 held in propagation delay identifier holding means 810 of second transmitting apparatus 814, propagation delay identifier 812 of second transmitting apparatus 814 can be made to have the same value as propagation delay identifier 804 read out from first transmitting apparatus 806. This is because the propagation delay identifier is found only from the connection topology of the bus and the minimum propagation delay identifier among them can be used if it is a node connected to the same bus, although a different value could be written at every node according to a calculation method used when the propagation delay identifier mentioned later is calculated.

As mentioned before, the initial value of the propagation delay identifier holding means is a value corresponding to the case the bus has a maximum composition allowed by P1394 standard. Therefore, second transmitting apparatus 814 which is given a bandwidth has an initial value as a propagation delay identifier 812 and on the other hand, propagation delay identifier 804 of first transmitting apparatus 806 can effectively use the bandwidth which the transmitting medium has by comparing which value is smaller and adopting the smaller one when the bandwidth is given in the case when a smaller value than the initial value is written, by checking the connection topology of the bus.

Figure 9:
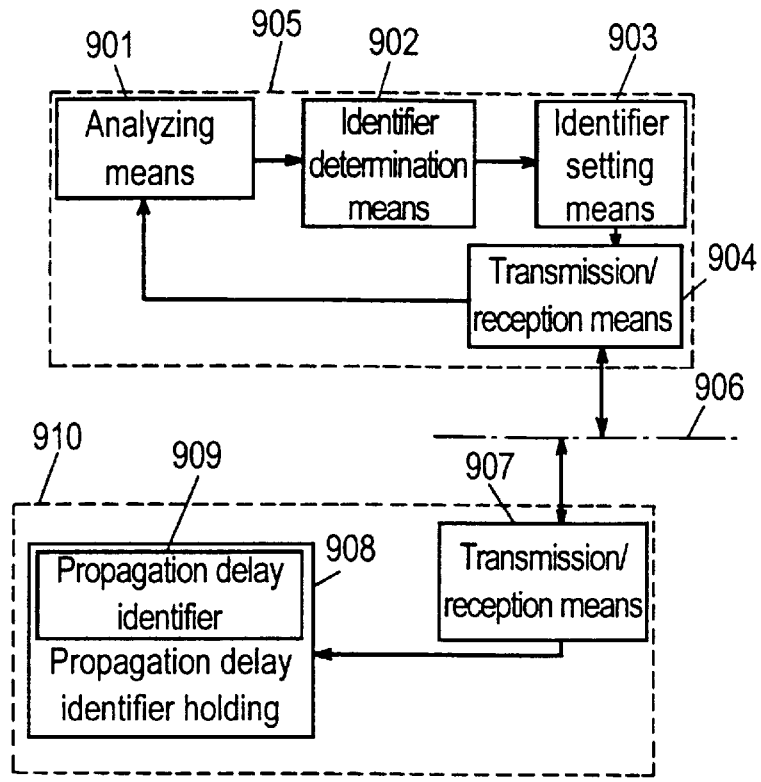
FIG. 9 is a block diagram of essential parts of a transmission control apparatus for determining and setting a propagation delay identifier and a transmitting apparatus in which the propagation delay identifier is set in accordance with an exemplary embodiment of the present invention.

FIG. 9 shows a block diagram of a procedure when a transmission control apparatus founds a propagation delay identifier. In the exemplary embodiment, a transmitting apparatus 910 is composed of transmission/reception means 907 for transmitting and receiving a packet to and from a transmitting medium 906 and propagation delay identifier holding means 908 for holding a propagation delay identifier 909. A transmission control apparatus 905 is composed of analyzing means 901 for analyzing a connection topology of the apparatuses connected to a transmitting medium, identifier determination means 902 for determining propagation delay identifier according to the analysis result, identifier setting means 903 for setting propagation delay identifier 909 in propagation delay identifier holding means 908 of transmitting apparatus 910, and transmission/reception means for transmitting and receiving a packet to and from transmitting medium 906.

Analysis means 901 receives all of the self ID packets outputted from each node connected to the bus at the reset of P1394 and analyzes a tree structure of the bus, using the information included in the self ID packets. BY analyzing the tree structure, the number of relay nodes when communication is made between any two of the nodes is found and the maximum value is outputted. On the other hand, identifier determination means 902 calculates a maximum propagation delay which could occur from the maximum number of relay nodes at the bus inputted from analyzing means 901 and finds the size of the overhead bandwidth necessary to acquire at isochronous data transmission based on this value. Identifier determination means 902 determines which the most appropriate propagation delay identifier is from the overhead bandwidth and outputs it.

As the correspondence between the number of relay nodes and the overhead bandwidth used in this case, for example, the values shown in Table 2 can be used.

TABLE 2

| the number of relay nodes | overhead bandwidth |
| --- | --- |
| 0 | 113 |
| 1 | 137 |
| 2 | 162 |
| 3 | 166 |
| 4 | 210 |
| 5 | 235 |
| 6 | 259 |
| 7 | 283 |
| 8 | 307 |
| 9 | 332 |
| 10 | 356 |
| 11 | 380 |
| 12 | 405 |
| 13 | 429 |
| 14 | 453 |
| 15 | 477 |

The values shown in Table 2 are maximum values determined independent of the location of the node controlling the ownership of bus and are calculated using Eq. 2. It is also possible to calculate a propagation delay, considering the location of the node controlling the ownership of bus on the bus. In this case, even if the maximum number of relay nodes existing on the bus is the same, the value could be a smaller than an overhead bandwidth shown in Table 1. The values shown in Table 1 are used for the response between overhead bandwidths and bit patterns of 4 bit propagation delay identifiers. The propagation delay identifier can be determined like the above.

Thus, identifier determination means 902 obtains the overhead bandwidth from the maximum number of relay nodes supplied from analyzing means 901 and determines the propagation delay identifier from the overhead bandwidth and outputs it. The overhead bandwidth can be determined in only one value from the propagation delay identifier by determining such a correspondence.

Identifier setting means 903 receives a propagation delay identifier determined at identifier determination means 902 and writes in propagation delay identifier holding means 908 of transmitting apparatus 910. The writing is done by writing procedure to the PCR, using an asynchronous packet.

As mentioned above, an identifier determined by a maximum connection topology allowed for P1394 is written as an initial value in propagation delay identifier holding means 908 of transmitting apparatus 910. To change this value, it is necessary to analyze the connection topology of the bus and know the maximum number of relay nodes. However, because a isochronous data communication is possible even if the propagation delay identifier is used as it is an initial value without analyzing the connection topology of the bus, not all transmitting apparatuses have to provide with analyzing means 901 of connection topology, identifier determination means 902 or identifier setting means 903. In this case, because a larger bandwidth than an originally necessary bandwidth is acquired, it is impossible to effectively use the bandwidth which the transmitting medium has.

It becomes possible to efficiently use the bandwidth which the transmitting medium has by connecting transmission control apparatus 905 to the transmitting medium, finding a propagation delay identifier by analyzing the connection topology of the apparatuses connected to the bus, and setting a propagation delay identifier which is thought appropriate for propagation delay identifier holding means of the transmitting apparatus connected to the bus. Because propagation delay identifier holding means can write through a bus, if there is at least one transmission control apparatus on the bus, it is possible to set a smaller propagation delay identifier than the initial value and as a result, not all transmitting apparatuses have to provide with analyzing means 901 of connection topology, identifier determination means 902 or the like and it becomes possible to effectively use the bandwidth which the transmitting medium has by only having a correspondence table between propagation delay identifiers and overhead bandwidths shown in Table 1.

A transmission control apparatus other than the transmitting apparatuses having a propagation delay identifier holding means could write more appropriate propagation delay identifiers than the value already set. Accordingly, when the bandwidth acquiring means acquires the bandwidth as mentioned above, it is necessary to read a value at propagation delay identifier holding means and find an overhead bandwidth based on the read value.

Further, the propagation delay identifier held in propagation delay identifier holding means has to be the value used when the bandwidth was acquired, for using at switching transmitting apparatuses. Accordingly, a transmitting apparatus which a propagation delay identifier is set by the transmission control apparatus is restricted only to the transmitting apparatus which does not transmit at the time. That is, a propagation delay identifier can be set only when both broadcast connection counter 702 of the PCR and point-to-point connection counter 703 are zero.

The most appropriate value of a propagation delay identifier is originally determined in one value when the connection topology of the bus is determined. However, to find the most appropriate value, the connection topology of the bus is analyzed and all the number of relay nodes between nodes and in some cases, the location of the control node of the ownership of bus on the bus have correctly to be obtained. A complex analyzing process is required to do such a processing. When there are few apparatuses connected to the bus, the propagation delay identifier can be set to a smaller value than the initial value only based on the number of apparatuses which may not be the most appropriate.

In P1394, it is decided by a standard that the number of relay nodes between the farthest nodes must be 15 and the number of connection times must be 16. When the number of nodes M connected to the bus is smaller than 17, the number of relay nodes between the farthest nodes never exceeds (M−2) whatever connection topology is taken.

Accordingly, in such a case, the connection topology is not analyzed and the propagation delay identifier can be determined, regarding (M−2) which is the maximum number of relay nodes of the number of nodes connected the bus as the number of relay nodes. When M is larger than 17, the value 15 which is the maximum value of the values allowed for P1394 is used. By setting a propagation delay identifier obtained like the above, it becomes possible to effectively use the bandwidth comparing with the case propagation delay identifier is not set at all, without taking a complex process, although the bandwidth which the transmitting medium has can not be used to the full.

Thus, there could be a plurality of methods by which a transmitting apparatus finds a propagation delay identifier and there could be a plurality of transmission control apparatuses to set propagation delay identifiers on the same bus. Accordingly, in propagation delay identifier holding means in which a propagation delay identifier which is thought to be the most appropriate is written, a larger propagation delay identifier than that is sometimes written. In such a case, it could be dangerous that the bandwidth which the transmitting medium has can not be effectively used. The above problem can be prevented by setting a propagation delay identifier only when it is smaller than the value already set, comparing a value now trying to set with the value already set.

AVAILABILITY IN THE INDUSTRIAL FIELD

In the first invention, data transmission is stopped by that the data bandwidth inputted to a transmitting apparatus changes when the bandwidth necessary for outputting to a transmitting medium exceeds the bandwidth acquired before communication and as a result, it is possible to prevent to disturb a continuous communication of the other apparatuses using the same transmitting medium.

In the second invention, data transmission is stopped by that the data bandwidth inputted to a transmitting apparatus changes when the bandwidth necessary for outputting to a transmitting medium exceeds the bandwidth acquired before communication and as a result, it is possible to prevent to disturb a continuous communication of the other apparatuses using the same transmitting medium and in addition to this, it is possible to inform the bandwidth necessary for data transmission to a receiving apparatus by transmitting the data bandwidth to be transmitted even while the data transmission is stopped and apparatuses which received the data can work using this bandwidth information.

In the third invention, a state of transmission stop at the transmitting apparatus is detected and a corresponding process at the receiving apparatus can be done by detecting that any data is not received for a designated period, when the data is received from the transmitting medium.

In the fourth invention, a state of transmission stop at the transmitting apparatus is detected and a corresponding process at the receiving apparatus can be done by detecting that any data is not received for a designated period, when the data is received from the transmitting medium and in addition to this, it is possible to do a corresponding process based on the bandwidth information of the receiving data.

In the fifth invention, because the propagation delay identifier used at bandwidth acquisition and the maximum transmission data size can be read from the outside through a transmitting medium, a different apparatus connected to the same transmitting medium can get the acquired bandwidth and as a result, the procedure to acquire a bandwidth accompanied with bandwidth transition when a different transmitting apparatus transmits using the already acquired bandwidth can be simplified.

In the sixth invention, it is possible to effectively use the bandwidth which a transmitting medium has by that a transmission control apparatus analyzes a connection topology of the apparatus connected to the transmitting medium and set a propagation delay identifier based on the analysis result. Further, because the propagation delay identifier can be set from the outside of the apparatus through the transmitting medium, it is possible to effectively use the bandwidth which the transmitting medium has by that there is at least one transmission control apparatus on the transmitting medium, even not all transmitting apparatuses have analyzing means to analyze a connection form of the apparatus connected to the transmitting medium.

In the seventh invention, it is possible to effectively use the bandwidth without requiring any complex process by judging based on the number of apparatuses connected to the transmitting medium, when the connection topology of the apparatuses connected to the transmitting medium is analyzed.

In the eighth invention, a transmitting apparatus which is unnecessary of an internal analysis of a digital signal can be gotten by counting the data size and it is possible to reduce hardware and cost.

In the ninth invention, it is possible to control at a transmitting apparatus so that the buffer at the receiving apparatus side does not overflow or under flow, by adjusting transmission timing, the number of data packets in the buffer in the receiving apparatus becomes maximum in a range it does not overflow by controlling so as to take as large value as possible in a range not to exceed the fixed value as a counted value and it is possible not to interrupt the output in the receiving apparatus as many as possible when some trouble occurs at the transmitting apparatus or on the transmission medium and transmission packets do not arrive in the receiving apparatus for a certain period.

In the tenth invention, it is possible to output to a recording apparatus at correct timing without overflowing of the buffer inside the receiving apparatus, by that a transmitting apparatus adds a transmission time stamp indicating timing which a receiving apparatus outputs to the data and transmits it and a receiving apparatus outputs at the timing written in the transmission time stamp.

What is claimed:

1. At data transmitting apparatus which is one of a plurality of apparatuses, said plurality of apparatuses having a connection topology as a result of being coupled together by a transmitting medium, the data transmitting apparatus comprising:

propagation delay identifier holding means for holding a propagation delay identifier which is determined by the propagation delay which corresponds to the connection topology of said transmitting medium; and maximum transmission data size holding means for holding maximum transmission data size expressing maximum size of the data which can be contained in a packer transmitted to said transmitting medium;

said transmitting apparatus having a bandwidth available for itself which corresponds to said maximum transmission data size and said propagation delay identifier;

wherein said bandwidth available for said data transmitting apparatus is changeable by one of said plurality of apparatuses based upon said connection topology.

2. A control apparatus for use with a plurality of transmitting apparatuses, said plurality of transmitting apparatuses having a connection topology as a result of being coupled together by a transmitting medium, each of said transmitting apparatuses including:

propagation delay identifier holding means for holding a propagation delay identifier which is determined by the propagation delay which corresponds to the connection topology of said transmitting medium, the control apparatus comprising: analyzing means for analyzing the connection topology;

identifier determination means for determining said propagation delay identifier according to an analyzing result outputted from said analyzing means; and identifier setting means for setting said propagation delay identifier determined at said identifier determination means in said propagation delay identifier holding means;

wherein said bandwidth available for one of said plurality of transmitting apparatuses is changeable by any of said plurality of transmitting apparatuses based upon said connection topology.

3. A data transmission control apparatus as recited in claim 2, wherein:

said analyzing means determines the connection topology according to a number of maximum relay apparatuses assumed from a number of apparatuses connected to the transmitting medium.

4. A data transmission apparatus according to claim 1, wherein said maximum transmission data size is readable and said propagation delay identifier is readable and changeable by a further one of said plurality of apparatuses.

5. A data transmission control apparatus according to claim 2, wherein said maximum transmission data size is readable and said propagation delay identifier is readable and changeable by a further one of said plurality of apparatuses.

* * * * *

UNITED STATES PATENT AND TRADEMARK OFFICE
CERTIFICATE OF CORRECTION

PATENT NO. : 6,128,316
DATED : October 3, 2000
INVENTOR(S) : Takeda et al.

It is certified that error appears in the above-identified patent and that said Letters Patent is hereby corrected as shown below:

<u>Title page,</u>
Item [56], References Cited, insert
-- U.S. PATENT DOCUMENTS
4,635,121    1/1987    Hoffman et al.

FOREIGN PATENT DOCUMENTS
0668698    2/1995    European Pat. Off.
0191149    11/1985   European Pat. Off.
2126002    3/1984    Great Britain
3616743    11/1987   Germany
7-203323   8/1995    Japan
4-284080   10/1992   Japan OTHER PUBLICATIONS
European Search Report, application no. 97117287.9, dated January 26, 2000. --

<u>Column 26,</u>
Line 44, "At" should read -- A --.
Line 56, "packer" should read -- packet --.

Signed and Sealed this

Nineteenth Day of March, 2002

Attest:

JAMES E. ROGAN
Attesting Officer    Director of the United States Patent and Trademark Office